(12) United States Patent
Doole et al.

(10) Patent No.: US 12,393,569 B2
(45) Date of Patent: Aug. 19, 2025

(54) OPERATION STATEMENT ANALYSIS FOR DATABASE TRIGGER FIRING

(71) Applicant: Salesforce, Inc., San Francisco, CA (US)

(72) Inventors: Douglas Doole, Livermore, CA (US); Simon Y. Wong, San Carlos, CA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/413,540

(22) Filed: Jan. 16, 2024

(65) Prior Publication Data

US 2025/0231927 A1     Jul. 17, 2025

(51) Int. Cl.
*G06F 16/00* (2019.01)
*G06F 16/23* (2019.01)
*G06F 16/2455* (2019.01)

(52) U.S. Cl.
CPC ...... *G06F 16/2365* (2019.01); *G06F 16/2379* (2019.01); *G06F 16/24565* (2019.01)

(58) Field of Classification Search
CPC ............. G06F 16/2365; G06F 16/2379; G06F 16/24565
USPC ........................................................ 707/702
See application file for complete search history.

(56) References Cited

U.S. PATENT DOCUMENTS

| | | | |
|---|---|---|---|
| 6,185,577 B1 | 2/2001 | Nainani et al. | |
| 6,233,585 B1 | 5/2001 | Gupta et al. | |
| 6,698,010 B1 * | 2/2004 | Yamanouchi | G06F 16/2438 717/106 |
| 7,512,631 B2 | 3/2009 | Medicke et al. | |
| 8,447,745 B2 | 5/2013 | Ahuja et al. | |
| 8,548,952 B2 | 10/2013 | Weissman et al. | |
| 8,738,590 B2 | 5/2014 | Bezar et al. | |
| 8,874,593 B2 | 10/2014 | Unger et al. | |
| 8,898,124 B2 * | 11/2014 | Anderson | G06F 16/24565 707/702 |

(Continued)

FOREIGN PATENT DOCUMENTS

| | | |
|---|---|---|
| WO | 2008042980 A3 | 4/2008 |
| WO | 2021225646 A1 | 11/2021 |

OTHER PUBLICATIONS

Sanjit K. Kaul et al., "Status Updates Through Queues," IEEE; 2012; pp. 1-6.

(Continued)

*Primary Examiner* — Bai D Vu
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed relating to implementing database trigger firing criteria to reduce unnecessary trigger firings. In one embodiment a computer system stores trigger information relating to initiating execution of at least one trigger instruction for a database, in connection with a particular database operation specified by a database operation statement. The trigger information includes a set of one or more database field identifiers for a set of one or more fields in the database. The computer system receives a first database operation statement and makes a determination that at least one field within the set of fields is not specified by the first database operation statement. Based at least in part on the determination, the computer system initiates execution of the at least one trigger instruction.

20 Claims, 12 Drawing Sheets

(56) References Cited

U.S. PATENT DOCUMENTS

| | | | |
|---|---|---|---|
| 8,918,361 B2 | 12/2014 | Wong et al. | |
| 8,930,322 B2 | 1/2015 | Weissman et al. | |
| 9,053,231 B2 | 6/2015 | Agrawal et al. | |
| 9,367,431 B2 | 6/2016 | Unger et al. | |
| 9,501,516 B2 | 11/2016 | Driesen | |
| 10,649,987 B2 | 5/2020 | Wong et al. | |
| 11,397,714 B2 | 7/2022 | Rielau et al. | |
| 2002/0184207 A1* | 12/2002 | Anderson | G06F 16/24565 |
| 2003/0115178 A1 | 6/2003 | Doole et al. | |
| 2003/0154197 A1 | 8/2003 | Millet et al. | |
| 2003/0200214 A1 | 10/2003 | Doole et al. | |
| 2005/0097149 A1 | 5/2005 | Vaitzblit et al. | |
| 2005/0114827 A1* | 5/2005 | Lane | G06F 8/20 |
| | | | 719/321 |
| 2005/0125371 A1 | 6/2005 | Bhide et al. | |
| 2008/0086479 A1 | 4/2008 | Fry et al. | |
| 2008/0270368 A1* | 10/2008 | Cotner | G06F 16/24542 |
| 2010/0070480 A1* | 3/2010 | Ahuja | G06F 16/25 |
| | | | 707/703 |
| 2011/0016202 A1* | 1/2011 | Ye | H04L 41/044 |
| | | | 709/222 |
| 2013/0007069 A1 | 1/2013 | Chaliparambil et al. | |
| 2014/0025642 A1* | 1/2014 | Wong | G06F 16/2379 |
| | | | 707/684 |
| 2014/0172889 A1 | 6/2014 | Adam et al. | |
| 2015/0278320 A1* | 10/2015 | Bhatnagar | G06F 16/23 |
| | | | 707/610 |
| 2017/0116321 A1 | 4/2017 | Jain et al. | |
| 2021/0342322 A1 | 11/2021 | Rielau et al. | |
| 2024/0086387 A1* | 3/2024 | Doole | G06F 16/2282 |

OTHER PUBLICATIONS

Yoongu Kim et al., "Flipping Bits in Memory Without Accessing Them: An Experimental Study of DRAM Disturbance Errors," 2014, IEEE; pp. 361-372.

* cited by examiner

| Prod | C1M | C2M | C1Y | C2Y | AllM | AllY | LUp |
|---|---|---|---|---|---|---|---|
| A | $10 | $15 | $25 | $40 | $25 | $65 | 12/5/20 10:05 |
| B | $50 | $10 | $200 | $60 | $60 | $260 | 12/6/20 15:15 |
| C | $5 | $15 | $5 | $55 | $20 | $60 | 12/1/20 8:00 |
| D | $22 | $50 | $41 | $120 | $72 | $161 | 12/19/20 12:03 |

Table 300

FIG. 3

Trigger Firing Table 520 →

| 408 | | 514 | |
|---|---|---|---|
| UPDATE | OF | NOT AllM, NOT AllY | |
| | | 410 | |
| | | 522 | |

| DB Operation Statement | Field Operated On by DB Operation Statement (X=Operated) | | | | | | | Trigger Fire (Y/N) |
|---|---|---|---|---|---|---|---|---|
| | C1M | C2M | C1Y | C2Y | AllM | AllY | LUp | |
| 1 | X | | | | | | | Y |
| 2 | X | | | X | X | X | X | Y |
| 3 | | X | | | | | X | N |

Trigger Firing Table 530 →

| 408 | | 412 | 514 |
|---|---|---|---|
| UPDATE | OF | C2M, | NOT LUp |
| | | 410 | |
| | | 532 | |

| DB Operation Statement | Field Operated On by DB Operation Statement (X=Operated) | | | | | | | Trigger Fire (Y/N) |
|---|---|---|---|---|---|---|---|---|
| | C1M | C2M | C1Y | C2Y | AllM | AllY | LUp | |
| 1 | X | | | | | | | Y |
| 2 | X | | | X | X | X | X | N |
| 3 | | X | | | | | X | Y |

Trigger Firing Table 600 →

| DB Operation Statement | Field Operated On by DB Operation Statement (X=Operated) | | | | | | | Trigger Fire (Y/N) |
|---|---|---|---|---|---|---|---|---|
| | C1M | C2M | C1Y | C2Y | All/M | All/Y | LUp | |
| 1 | X | | | | | | | N |
| 2 | X | | | | X | X | X | N |
| 3 | | X | | X | X | X | X | N |

| UPDATE | OF | C1M | AND | C2M |

*FIG. 6A*

Trigger Firing Table 610 →

| DB Operation Statement | Field Operated On by DB Operation Statement (X=Operated) | | | | | | | Trigger Fire (Y/N) |
|---|---|---|---|---|---|---|---|---|
| | C1M | C2M | C1Y | C2Y | All/M | All/Y | LUp | |
| 1 | X | | | | | | | Y |
| 2 | X | | | | X | X | X | Y |
| 3 | | X | | X | X | X | X | N |

| UPDATE | OF | NOT C1Y | AND | NOT C2Y |

*FIG. 6B*

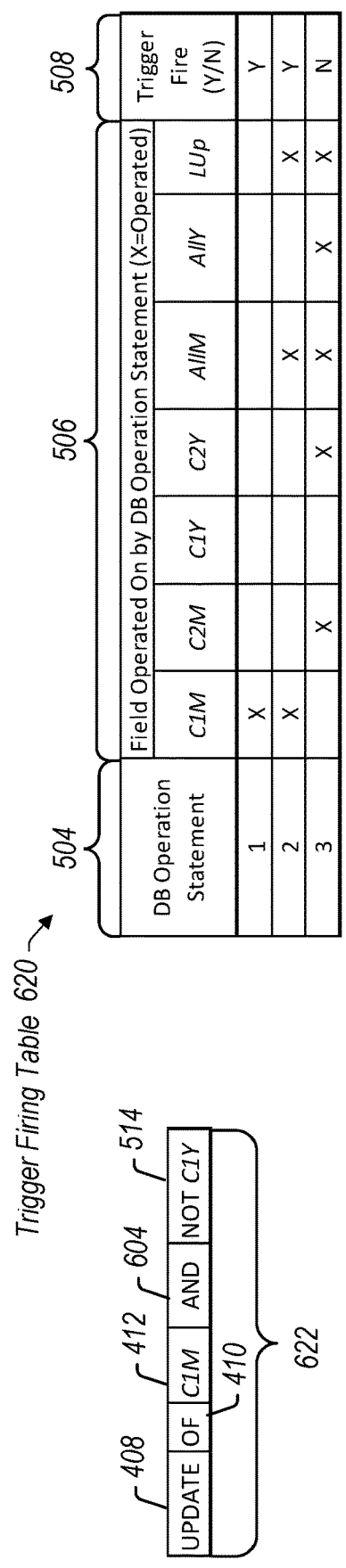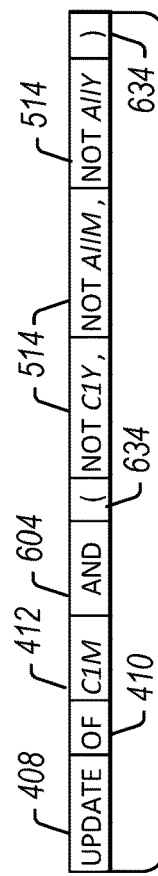
FIG. 6C
FIG. 6D

*800*

Storing trigger information relating to execution of at least one trigger instruction for a database, in connection with a database update operation specified by a database operation statement for the database, where the trigger information includes a first set of one or more database field identifiers for a respective first set of one or more fields in the database

810

↓

*Receiving a first database operation statement specifying the database update operation*

820

↓

*Making a first determination of whether at least one field within the first set is not specified by the first database operation statement*

830

↓

*Making a second determination, based at least in part on a result of the first determination, of whether to initiate execution of the at least one trigger instruction*

```
                                                    ┌─ 900
                                                    ▼
┌─────────────────────────────────────────────────────────────────┐
│  Storing trigger information relating to execution of at least  │
│  one trigger instruction for a database, in connection with a   │
│  particular database operation specified by a database          │
│  operation statement for the database, where the trigger        │
│  information includes a first set of one or more database       │
│  field identifiers for a respective first set of one or more    │
│  fields in the database and a second set of one or more         │
│  database field identifiers for a respective second set of one  │
│  or more fields in the database                                 │
│                               910                               │
└─────────────────────────────────────────────────────────────────┘
                                   │
                                   ▼
┌─────────────────────────────────────────────────────────────────┐
│  Receiving a first database operation statement specifying the  │
│              particular database operation                      │
│                                                                 │
│                               920                               │
└─────────────────────────────────────────────────────────────────┘
                                   │
                                   ▼
┌─────────────────────────────────────────────────────────────────┐
│  Making a first determination relating to the first database    │
│  operation statement and the first set of one or more fields    │
│                                                                 │
│                               930                               │
└─────────────────────────────────────────────────────────────────┘
                                   │
                                   ▼
┌─────────────────────────────────────────────────────────────────┐
│  Making a second determination relating to the first database   │
│  operation statement and the second set of one or more fields   │
│                                                                 │
│                               940                               │
└─────────────────────────────────────────────────────────────────┘
                                   │
                                   ▼
┌─────────────────────────────────────────────────────────────────┐
│  Initiating execution of the at least one trigger instruction   │
│  based on the first determination and the second determination  │
│                                                                 │
│                               950                               │
└─────────────────────────────────────────────────────────────────┘
```

FIG. 9

OPERATION STATEMENT ANALYSIS FOR DATABASE TRIGGER FIRING

BACKGROUND

Technical Field

This disclosure relates generally to database systems and, more specifically, to various mechanisms for implementing more selective firing of a database trigger.

Description of the Related Art

Modern database systems routinely enable users to store a collection of information as a database that is organized in a manner that can be efficiently accessed and manipulated. Those systems often store at least a portion of that information in database tables that are composed of columns and rows in which a column corresponds to a field defining a grouping of that information and a row stores a record within the table. During its operation, a database system can perform database transactions that involve reading and/or writing information with respect to the database. When new information is being inserted into the database, the database system may insert that information as a set of records in a database table. In some cases, in connection with performing an operation on a database table (e.g., by inserting records), the system executes additional routines with respect to that database table. Some such routines are called database triggers, which are "triggered" to execute by a particular database operation. For certain database operations defined to operate on particular fields, or columns, of a database table, a trigger may be defined to execute, or "fire," in connection with operation on one or more particular fields.

BRIEF DESCRIPTION OF THE DRAWINGS

FIG. 3 is a table illustrating example elements of a database table, according to some embodiments.

FIGS. 5A-5D are tables illustrating example trigger firing scenarios, according to some embodiments.

FIGS. 6A-6D are tables illustrating example trigger firing scenarios, according to some embodiments.

FIGS. 7-9 are flow diagrams illustrating example methods relating to initiating execution of a database trigger, according to some embodiments.

DETAILED DESCRIPTION

Figure 1:
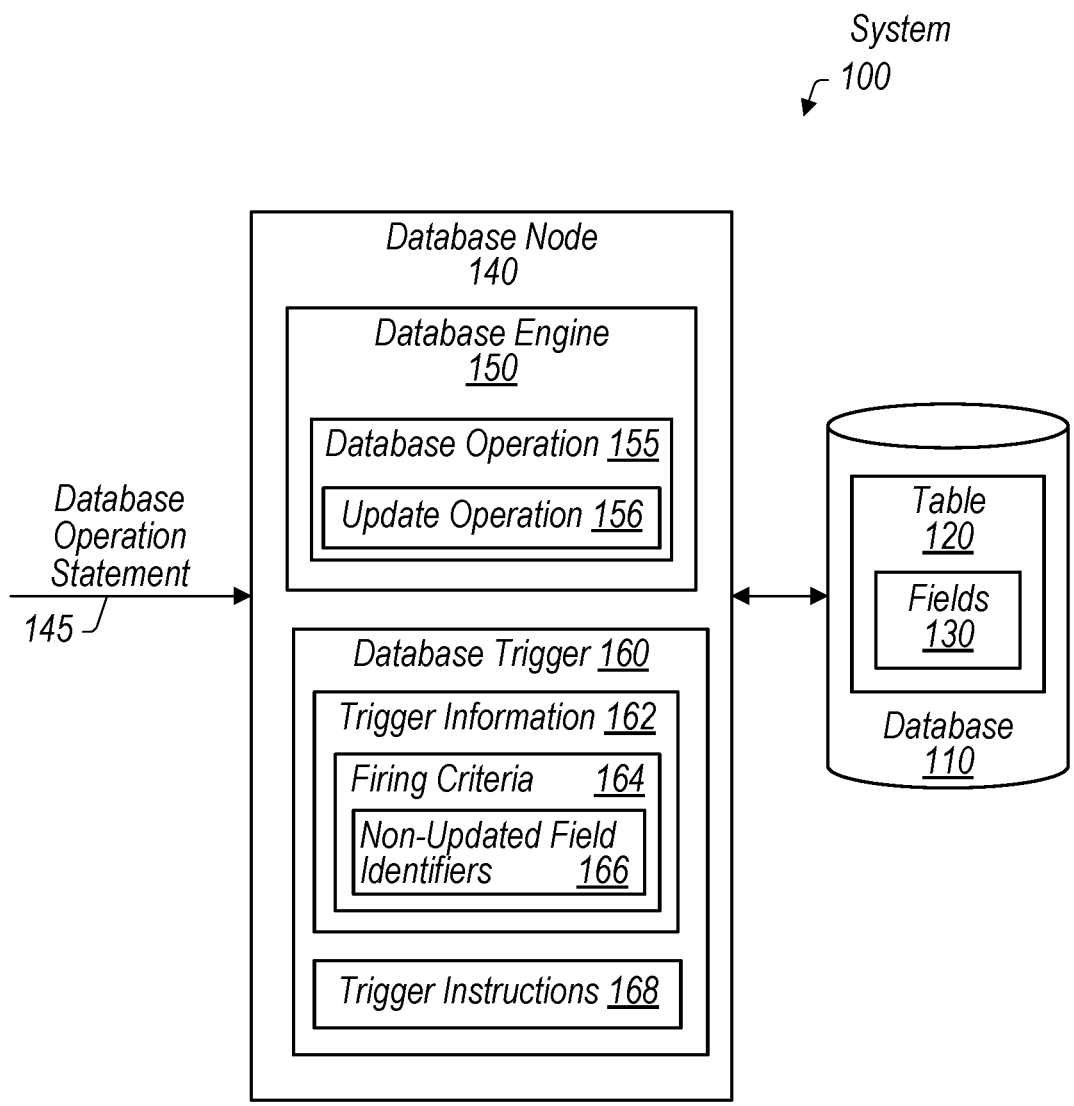
FIG. 1 is a block diagram illustrating example elements of a system including a database and a database node storing database trigger firing criteria, according to some embodiments.

In many cases, a database system allows for database triggers to be defined, stored, and then executed by the database system. As used herein, the phrase "database trigger" (or simply "trigger") is used in accordance with its well-understood meaning and refers to procedural code that is executed in connection with a certain event (herein referred to as the "trigger event") that occurs at a database system. For example, a user can define a trigger that performs auditing on rows of a database table that have been updated as a part of the database system executing an update operation, such as a Structured Query Language (SQL) UPDATE statement, on the database table.

In some embodiments, database triggers are created by administrators of a database in an effort to maintain integrity of the database. Such database triggers may have the effect of "cleaning up after" users (whether humans or, for example, application programs) performing operations on the database. For example, if a "last updated" field containing a timestamp is supposed to be updated each time a record of a particular table is updated, an administrator may set up a trigger to fire for every update operation and check to see whether the "last updated" field is being updated properly and take care of the timestamp update if necessary.

Because execution of the instructions to carry out a database trigger requires time and other system resources such as memory and registers, there is a cost to frequently invoking triggers for checking whether database operations are being performed correctly, particularly when the checking reveals that the operation was done correctly, and it therefore wasn't necessary to fire the trigger. Execution of trigger instructions occupies the database node, slowing execution of database operations. It would therefore be advantageous to avoid firing of triggers unnecessarily.

The present disclosure describes various database trigger implementations employing trigger firing criteria that may reduce unnecessary trigger execution. In various embodiments described below, a system includes a database and a database node that reads and writes data with respect to the database. The database node may receive trigger information identifying a trigger having a set of instructions to be executed in connection with an operation being performed on an associated database table of the database. The operation may be an operation that can be performed on specified fields, or columns, of the database table, such as an UPDATE operation in some database systems. In an embodiment, a database trigger is defined to fire if one or more fields of the database table are not operated upon (for example, updated) by the database operation that the trigger is defined for. This is by contrast to previous database trigger definitions that cause a trigger to fire if one or more columns are operated upon.

In an embodiment, trigger firing decisions are made by analysis of a received database operation statement. For example, a trigger defined using existing technology may be defined to fire if a received database operation statement specifies updating at least one column from a group of one or more columns specified as updated in a definition for the trigger. In some embodiments, described herein, on the other hand, a trigger is defined to fire if a received database operation statement does not specify updating at least one column from a group of one or more columns specified as not updated in a definition for the trigger. For triggers designed to ensure that a particular field is operated on during a database operation, defining the trigger to fire when the particular field is not updated can reduce unnecessary trigger firings and the associated waste of computing resources. In an embodiment, the computational effort needed to determine from analyzing a received database operation statement that the statement does not specify updating a particular field is significantly smaller than the effort needed to check, during execution of a trigger, whether the particular field is being updated by execution of the database operation statement.

In an additional embodiment described herein, a database trigger is defined to fire if at least two fields or columns specified in a definition for the trigger are either specified for operation upon or not specified for operation upon by a database operation statement. In other words, a database trigger in such an embodiment is defined to implement an AND combination of columns in its firing criteria. This is by contrast to previous database trigger definitions implementing only an OR combination of columns in their firing criteria. Use of an AND combination of columns in a trigger firing decision may advantageously avoid excessive or unnecessary trigger firing, since AND combinations may result in fewer trigger firings than OR combinations. Example applications of the disclosed embodiments are discussed below, starting with reference to FIG. 1.

FIG. 1 is a block diagram of a system 100 including a set of components that may be implemented via hardware or a combination of hardware and software routines. Within the illustrated embodiment, system 100 includes a database 110 and a database node 140 coupled to database 110. As further shown, database 110 includes a table 120 having fields 130, and database node 140 includes a database engine 150 and a database trigger 160. Also as shown, database engine 150 executes a database operation 155 including an update operation 156. In an embodiment, database operation 155 is an operation that can be specified at the level of particular database fields such as fields 130 of table 120. In some embodiments, system 100 is implemented differently than depicted. For example, system 100 might include multiple database nodes 140 and a database node may include multiple database triggers 160 for database 110. As further examples, database 110 may store other database objects (e.g., indexes) and database transaction 155 may involve other types of database operations (e.g., an insert operation).

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Thus, database node 140 and database 110 may utilize the available cloud resources of the cloud infrastructure (e.g., computing resources, storage resources, network resources, etc.) to facilitate their operations. For example, database node 140 may execute in a virtual environment that is hosted on server-based hardware included in a datacenter of a cloud provider. But in some embodiments, system 100 is implemented utilizing a local or private infrastructure as opposed to a public cloud.

Database 110, in various embodiments, is a collection of information that is organized in a manner that allows for access, storage, and/or manipulation of that information. Database 110 may include supporting software (e.g., storage servers) that enables database node 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In some embodiments, data written to database 110 by database node 140 is accessible to other database nodes 140 in a multi-node configuration. In various embodiments, data is stored at database 110 in records that are associated with database tables, such as table 120.

Table 120, in various embodiments, is a database object having a set of data records—that set of data records may be an empty set. Table 120 may store data in an organized structure comprising rows and columns, where a column corresponds to a field 130 and a row corresponds to a record that includes one or more values for the columns. A field 130, in various embodiments, provides structure for table 120 and defines a category of data for which rows of table 120 may provide a value. For example, a field 130 might correspond to usernames and thus a row of table 120 may include a username value for that field/column. In various embodiments, table 120 stores data for multiple users/tenants. Thus, table 120 can include a field/column 130 defining tenant as a subset of data under which each row specifies a tenant that corresponds to the record represented by that row. Example elements of a database table are described in more detail in connection with FIG. 3. While database tables are discussed herein, in some embodiments other database objects may be used, such as a database view or a document in a non-relational database.

Database node 140, in various embodiments, provides database services, such as data storage, data retrieval, and/or data manipulation. In various embodiments, database node 140 is software that is executable on hardware, while in some embodiments, it encompasses both the hardware and the software. The database services may be provided to other components in system 100 or to components external to system 100. As shown, database node 140 can receive a database operation statement 145 requesting that node 140 perform a database operation 155. Database operation statement 145 may be received from an application node (not illustrated) via an established database connection, for example. An example of a database operation 155 could be a SQL UPDATE operation. A corresponding example of a database operation statement 145 could specify an update of data in specific fields 130 of a target database table 120 in the database.

Database engine 150, in various embodiments, is software that is executable to provide the database services of database node 140, including carrying out database operations 155. In various embodiments, database engine 150 processes database operations 155 in accordance with a set of guiding principles that ensure transactional consistency. One example of a set of guiding principles is ACID (Atomicity, Consistency, Isolation, and Durability). Database operations 155 can include, for example, an insert operation (e.g., a SQL INSERT), a delete operation (e.g., a SQL DELETE), or an update operation 156 (e.g., a SQL UPDATE). An update operation 156, in various embodiments, is an operation in which one or more existing records are updated. As such, to perform an update operation 156, database engine 150 may interact with database 110 to read records out of database 110 and to write updated records to database 110. In various embodiments, as part of processing a transaction 155, database engine 150 executes a set of user-defined procedures to implement desired functionality. In particular, database node 140 may access a definition of a user-defined procedure, compile it into an executable form, and then execute it. One example of such a procedure is a database trigger 160.

A database trigger 160, in various embodiments, is a set of one or more software routines executable to perform a set of one or more actions in connection with a particular trigger event corresponding to a particular table 120. For example, a database trigger 160 for table 120 may execute in response to database node 140 executing a Data Manipulation Language (DML) operation on table 120 as a database operation 155. In various embodiments, a database trigger 160 may be defined in a definition (e.g., a block of code) that is provided to system 100 by a user and then compiled into an executable form. As noted above, a user providing a trigger definition is in some embodiments different from a user later submitting a database operation statement. Example elements of a database trigger definition are discussed in more detail in connection with FIG. 4.

A database trigger 160 may be executable to modify data that belongs to its associated table 120 and/or another table 120 specified in its definition. As an example, a database trigger 160 might execute after an update to an employee table 120 but may modify data that is stored in a history table 120. This type of trigger, in which the trigger executes after the database operation is performed, may be referred to as an "AFTER trigger." As another example, a database trigger 160 might execute before an update to a table is actually written to the stored version of database 110 (writing to the stored version may be referred to as "writing to disk" regardless of the specific media used in storing database 110). In such an embodiment, the update may be written to working memory of database node 140, and the database trigger code accesses that working memory to potentially adjust the updated record before it is written to the stored version of the database. This type of trigger may be referred to as a "BEFORE trigger." In some embodiments, a database trigger executable to check whether a particular column, such as a timestamp column, is updated during a database operation operates as a BEFORE trigger. The disclosed embodiments are believed to be applicable to a wide range of trigger types, including BEFORE, AFTER or other types such as INSTEAD OF triggers.

As illustrated in FIG. 1, database trigger 160 includes trigger information 162 and trigger instructions 168. Trigger information 162 includes firing criteria 164, which includes a set of identifiers 166 of one or more non-updated fields. In an embodiment for which database trigger 160 is defined in connection with update operation 156, a database operation statement 145 specifying update operation 156 acting on a table 120 is analyzed to determine whether firing criteria 164 for trigger 160 are met. Non-updated field identifiers 166 identify one or more specific fields among fields 130 of table 120. Specifically, database trigger 160 is defined in this embodiment to fire if one or more of the non-updated fields corresponding to identifiers 166 are not specified by database operation statement 145 as being updated.

Trigger firing criteria allowing a trigger to be fired when a field is not operated on, rather than only when a field is operated on, may allow a number of unnecessary trigger firings to be reduced. For example, in the case of a trigger designed to make sure a certain field is updated in the event of an update to one or more other fields, an ability to fire the trigger only when the certain field is not updated can reduce unnecessary execution of the trigger. In an embodiment, analysis of an incoming update statement to determine whether it specifies update of the particular field is more computationally efficient than executing trigger instructions to check the working memory for old and new values of the particular field to see if execution of the update statement is actually updating the particular field.

Trigger instructions 168 include one or more instructions executed in the event that firing criteria 164 are met so that trigger 160 is executed, or "fired." Trigger instructions 168 may also be referred to as a "procedure" for the trigger. In the case of a trigger for checking whether a particular field is updated by execution of a database update statement, for example, instructions 168 may include instructions for accessing the "old" (before execution of the update statement) and "new" (after execution of the update statement) values of the particular field. If the "old" and "new" values are the same, indicating that execution of the update statement is not updating the particular field, trigger instructions 168 may include adjusting the "new" value. In the case of a BEFORE trigger executed before an updated row is written to the stored version of the database, the "old" value may be obtained from the stored database row, while the "new" value is from a virtual row in working memory of the database node. In the case of an AFTER trigger executed after an updated row is written to the stored version of the database, the "old" and "new" values may be obtained from one or more temporary transition tables created during execution of the update statement. In either case, obtaining and comparing the old and new values entails computational effort that is wasted if it turns out that the particular field was already being properly updated through operation of the update statement. Example elements of a database trigger 160 are discussed in greater detail with respect to FIG. 2.

Figure 2:
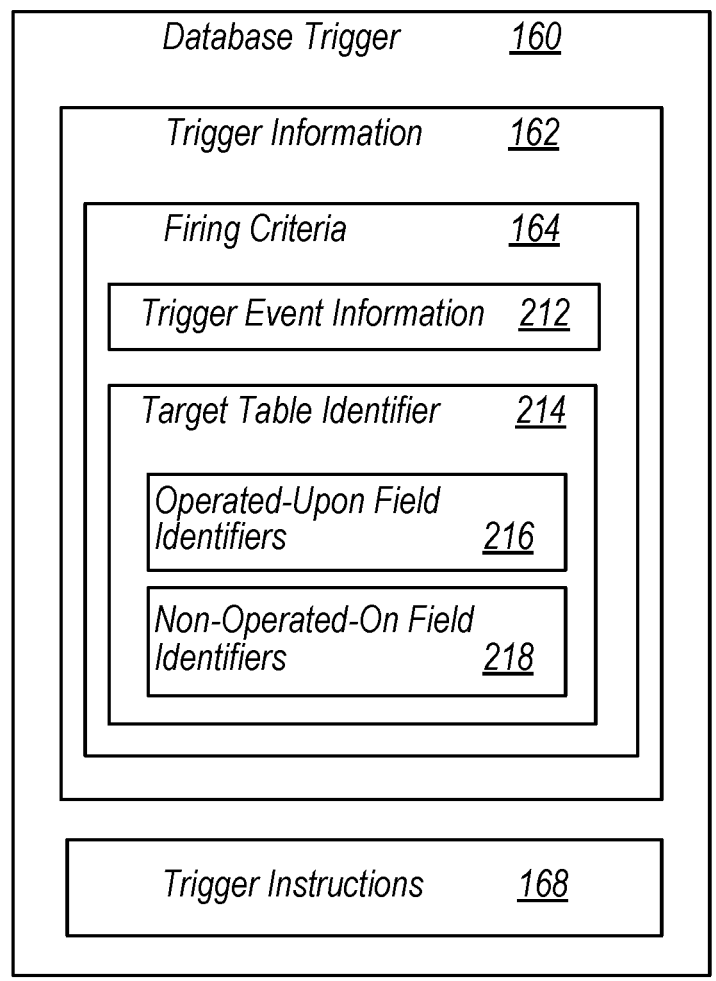
FIG. 2 is a block diagram illustrating example elements of a database trigger, according to some embodiments.

Turning now to FIG. 2, a block diagram of an example database trigger 160 is depicted. As also shown in FIG. 1, database trigger 160 includes trigger information 162 and trigger instructions 168. Trigger instructions 168 are described in connection with FIG. 1, while trigger information 162 includes additional elements within firing criteria 164 as compared to the embodiment of FIG. 1. In the embodiment of FIG. 2, firing criteria 164 within trigger information 162 includes trigger event information 212 and target table identifier 214. Target table identifier 214 is associated with operated-on field identifiers 216 and non-operated-on field identifiers 218. In various embodiments, database trigger 160 is defined in procedural code that provides one or more values for the illustrated elements as a part of a definition of database trigger 160.

Trigger event information 212, in various embodiments, identifies a database event involved in triggering the execution of trigger instructions 168. Database events can include, for example, the execution of DML operations (e.g., SQL UPDATE), Data Definition Language operations (e.g., SQL RENAME), Data Control Language operations (e.g., SQL REVOKE), etc. In some cases, multiple trigger events may be defined for database trigger 160 and included in trigger event information 212. As an example, database trigger 160 might be triggered in response to the execution of an SQL INSERT or DELETE operation. In various embodiments, trigger event information 212 also identifies a timing of trigger execution relative to the database event (such as before, after, or instead of the database event) and/or a frequency of trigger execution (such as per row of a database table or per statement). In the embodiment of FIG. 2, trigger event information 212 identifies an operation that can be specified on a per-field (or per-column) basis.

Target table identifier 214, in various embodiments, identifies a table 120 that is observed with respect to a trigger event identified by trigger event information 212. As an example, target table identifier 214 might identify a database table 120 and thus trigger instructions 168 may be executed based on an occurrence of a trigger event identified in trigger event information 212 in relation to that table 120. Although discussed in terms of a target table herein, database trigger 160 may in various embodiments be defined in terms of a trigger event targeted to a database view or other database object rather than a table. A view in this context is a virtual table specified by a query of the database. A view can form a kind of customized table selecting portions of one or more stored database tables.

In connection with target table identifier 214, firing criteria 164 may include operated-on field identifiers 216 and non-operated-on field identifiers 218. Operated-on field identifiers 216 identify one or more fields of the target table identified by target table identifier 214. Trigger 160 can be defined in various embodiments to fire based at least in part on whether at least one of the fields corresponding to identifiers 216 is operated upon by a database operation statement specifying the trigger event of trigger event information 212. For example, if the trigger event is an update operation in a database operation statement specifying an update of certain database fields, if one of the fields specified to be updated corresponds to one of operated-on field identifiers 216, trigger 160 will fire causing execution of trigger instructions 168. In an embodiment, a statement specifying that a value in a column be set is interpreted as updating the value, whether or not the value is actually changed by execution of the statement.

Non-operated-on field identifiers 218 identify one or more fields of the target table for which trigger 160 can be defined to fire based at least in part on at least one of the fields corresponding to identifiers 218 not being operated on by a database operation statement specifying the trigger event of trigger event information 212. For example, if the trigger event is an update operation in a database operation statement specifying an update of certain database fields, and if one of the fields corresponding to indicators 218 is not specified by the database operation statement to be updated, trigger 160 will fire. As illustrated in examples described in connection with FIGS. 5A-5D and 6A-6D, triggers may be defined in some embodiments to fire based on consideration of both operated-on fields and non-operated-on fields.

Turning now to FIG. 3, a block diagram of an example database table is shown. Table 300 is an example of a table 120 of database 110 as shown in FIG. 1. As illustrated, table 300 includes eight fields corresponding to columns of the table and four rows corresponding to four different records in a database such as database 110. Field 302 (corresponding to column heading "Prod") is a product identification field, with values of A, B, C and D identifying four different products. Field 304 (corresponding to column heading "C1M") is for sales to customer 1 in the current month, and has values of $10, $50, $5 and $22 corresponding to products A, B, C and D, respectively. Field 306 corresponding to column heading "C2M" is similar to field 304 but for sales in the current month to customer 2. Field 308 (corresponding to column heading "C1Y") is for sales to customer 1 for the year to date, while field 310 stores similar values for customer 2. Field 312 (corresponding to column heading "AllM") is for sales to all customers (here combining customers 1 and 2) in the current month, while field 314 is for sales to all customers in the year to date. Field 316 (corresponding to column heading "LUp") is a last-updated column containing a timestamp corresponding to each record.

In various embodiments, rules or policies are implemented to maintain integrity of table 300 and the database it belongs to. For example, one such rule may be that if either of the current month income fields for a particular customer (fields 304 and 306) is updated, the corresponding year-to-date income field for that customer (field 308 or 310) should be updated as well. As another example, a rule could require that if any of the fields having sales to a single customer is updated, the all-customer fields (312 and 314) should be updated also. Last update field 316 could in some embodiments be required by policy to be updated for an update to any other field in a given record. Alternatively, last update field 316 could be associated with update of a particular field or group of fields. Implementation of rules or policies such as these may in various embodiments be done using database triggers.

Figure 4:
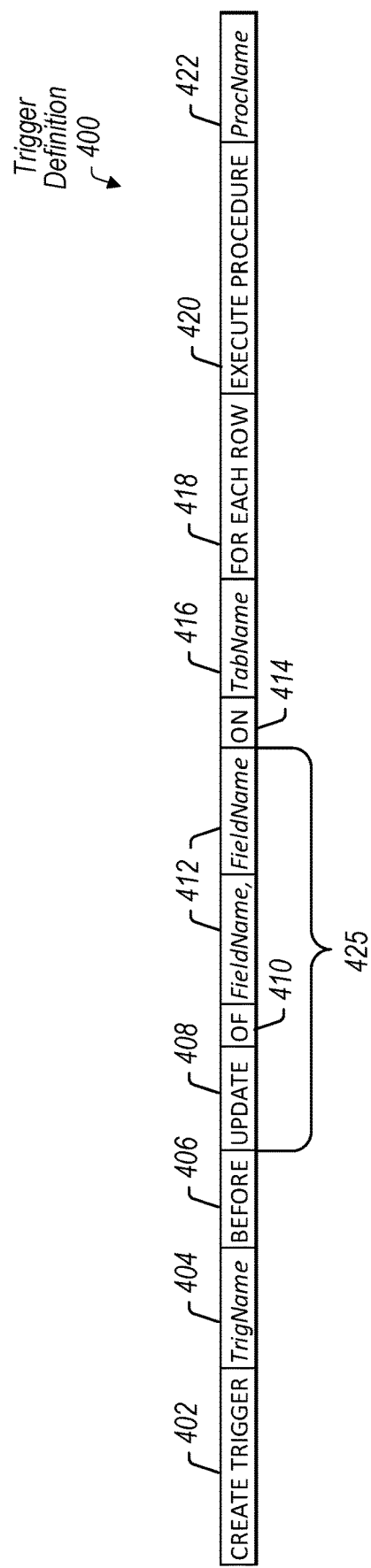
FIG. 4 is a block diagram illustrating example elements of a database trigger definition, according to some embodiments.

Turning now to FIG. 4, a block diagram illustrating example elements of a database trigger definition is shown. A trigger definition such as definition 400 may be provided to a database node for compiling into an executable form. The trigger definition includes information defining firing criteria for the trigger. The database node cause the trigger to be fired and the corresponding trigger instructions to be executed when the firing criteria are met by a received database operation statement. The particular commands and arrangement of elements in trigger definition 400 represent merely an example, and other language and syntax may be used in trigger definitions in other embodiments.

In the embodiment of FIG. 4, trigger definition 400 includes a trigger opening element 402 indicating that a trigger is being defined. In the illustrated embodiment, element 402 is a CREATE TRIGGER command; different command language may be used in other embodiments. Element 404 is a name for the trigger being created. Multiple different triggers are defined for a given database table in various embodiments. Trigger definition 400 further includes a timing element 406 indicating timing of trigger firing relative to a database operation. Element 406 is a BEFORE element in the embodiment of FIG. 4; triggers having different timing relationships, such as AFTER or INSTEAD OF triggers, may be defined in other embodiments.

Element 408 of trigger definition 400 is an operation element identifying a database operation causing the defined trigger to fire. In the illustrated embodiment, element 408 is an UPDATE operation; different operations may be associated with a trigger in other embodiments. Techniques described herein for reducing unnecessary trigger firings involve database operations specified on a per-field or per-column basis. A single operation element 408 is shown in FIG. 4, but other embodiments of a trigger definition may include multiple operations that can cause the trigger to fire. In some embodiments, trigger definitions including multiple operation elements connect the operation elements with OR in the trigger definition.

Element 410 is a field-specific operation indicator field. In the illustrated embodiment, element 410 is OF, which indicates that the UPDATE operation is applied in connection with certain fields with names following the OF. Other language may be used to indicate a field-specific operation in other embodiments. Elements 412 are operated-on field elements within a table identified by table element 416. Elements 412 include identifiers, such as names, of selected fields; the trigger defined in definition 400 is defined to execute in connection with the operation of element 408 being applied to one of the fields identified by elements 412. As such, the multiple element fields 412 are effectively combined with an OR operation. In an embodiment, the field names are column headings in database tables such as table 300 of FIG. 3. In the embodiment of FIG. 4, a comma is used to separate multiple field names in a list, but other conventions may be used in other embodiments. In various embodiments, trigger definitions specifying field-specific operations may include a single field element or a larger number of field elements than the two elements 412 shown in FIG. 4.

Element 414 of trigger definition 400 is a target table indicator field. In the illustrated embodiment, element 414 is ON, which indicates that the UPDATE operation of field 408 is applied to the table identified in the element following the ON. Other language may be used to indicate a target table for an operation in other embodiments. Table element 416 includes an identifier of the database table operated upon by the operation of field 408 in order to initiate execution of the trigger. The techniques disclosed herein may in some embodiments involve triggers defined for operations on database views instead of database tables. Element 416 may therefore be described as a target relation element, where a relation may include a database table or a database view, or a target object element.

Element 418 is a trigger frequency field indicating how often the trigger instructions are executed. In the illustrated embodiment, element 418 is FOR EACH ROW indicating that for any row of the target table (identified in element 416) having one of the fields (identified in elements 412) operated on by the operation identified in element 408, the trigger instructions will be executed. Other embodiments of a trigger definition may use a per statement frequency instead. Element 420 is a trigger execution element indicating that when the criteria established by the preceding elements are met, execution of a procedure identified in the following element 422 is to begin. The procedure identified by the procedure name in element 422 contains trigger instructions such as instructions 168 of FIG. 1.

A trigger definition such as definition 400 is provided to a database node such as node 140. The database node parses the trigger definition and stores trigger information accordingly so that the trigger will be executed when its firing criteria are met. As an example, operation element 408 of trigger definition 400 may be stored in trigger event information 212 of FIG. 2. Trigger event information 212 may also include information from elements 406 and 418 in some embodiments. As further examples, target table element 416 of FIG. 4 may be stored as target table identifier 214 of FIG. 2, and field names from elements 412 of FIG. 4 may be stored as operated-on field identifiers 216 of FIG. 2. For purposes of illustrating the techniques disclosed herein, a portion of the trigger definition including the operation and fields, labeled as portion 425 in the embodiment of FIG. 4, is focused on with respect to the examples that follow.

FIGS. 5A-5D and 6A-6D illustrate various trigger firing scenarios using fields from table 300 of FIG. 3.

Figure 5A:
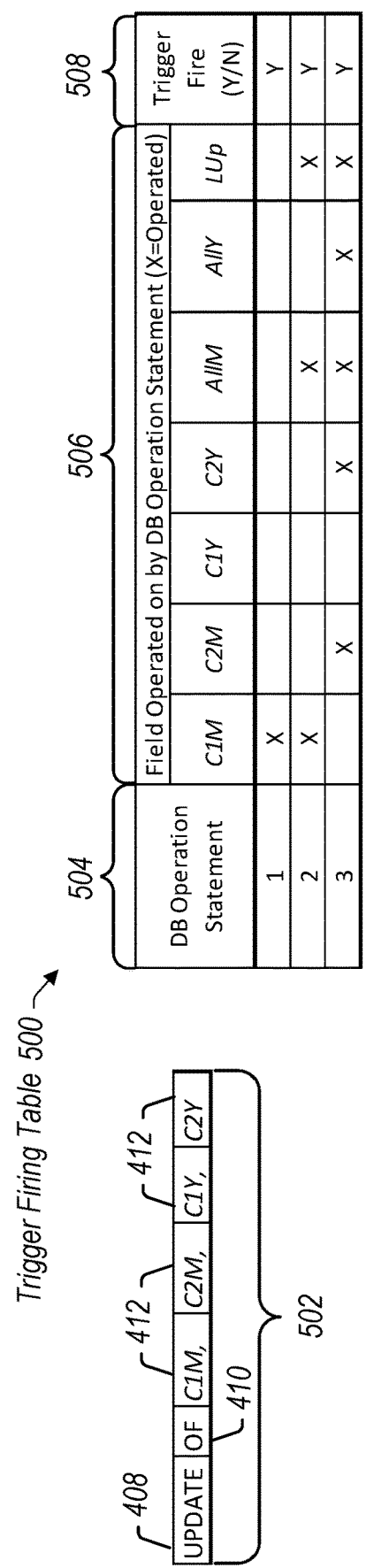

Turning to FIG. 5A, a portion 502 of a trigger definition includes fields similar to those of portion 425 of trigger definition 400 of FIG. 4. In various embodiments, a full trigger definition includes additional fields such as one or more of those shown in FIG. 4, but trigger definition portions as shown in FIGS. 5A-5D and 6A-6D are sufficient for discussion of the scenarios illustrated. In the embodiment of FIG. 5A trigger definition portion 502 specifies an UPDATE operation on any of a group of fields specified in operated-on field elements 412. In the examples of FIGS. 5A-5D and 6A-6D, field identifiers used correspond to fields of database table 300 of FIG. 3. Fields corresponding to field identifiers C1M, C2M, C1Y and C2Y of trigger definition portion 502 are described further in connection with the discussion of FIG. 3 above. Viewed in conjunction with FIG. 3, trigger definition portion 502 specifies that the defined trigger will fire if a received database operation statement specifies an UPDATE operation on a value in any of the columns corresponding to fields 304, 306, 308 or 310 of Table 300.

Trigger firing table 500 of FIG. 5A is a table illustrating trigger firing behavior for a trigger defined using trigger definition portion 502, in response to example database operation statements labeled 1, 2 and 3. It is noted that trigger firing table 500 is presented for purposes of explaining database operation and is not intended to represent an example of a table stored within a particular database. Trigger firing table 500 includes a statement column 504, a set 506 of field operation columns, and a trigger firing column 508. Column 504 includes identifiers of database ("DB") operation statements, similar to statement 145 of FIG. 1, that may be received by a database node such as node 140 of FIG. 1. Each database operation statement is characterized within table 500 by which fields within set of fields 506 the statement specifies operating on. For example, DB operation statement 1 specifies operation on the field having identifier C1M, while DB operation statement 2 specifies operation on the fields having identifiers C1M, AllM, and LUp. DB operation statement 3 specifies operation on the fields having identifiers C2M, C2Y, AllM, AllY, and LUp. In an embodiment, a database operation statement "specifies operation" on a field, as used herein, by explicitly including an identifier for the field (as opposed to, for example, an operation statement applying to all fields without identifying them specifically). For purposes of the scenarios of FIGS. 5A-5D and 6A-6D, the database operation statements of column 504 are assumed to match the presented trigger definition portion in the sense of performing the same operation, on the same database table or view, as specified by the trigger definition corresponding to the trigger definition portion. Although UPDATE operations are used in these scenarios, the techniques presented herein are believed to be applicable for any database operation that is performable on a per-column or per-field basis.

Trigger firing column 508 of table 500 indicates, based on trigger definition portion 502 and the fields operated on by a given database operation statement, whether the given database operation statement will cause the trigger to fire. For the scenario of FIG. 5A, the trigger will fire (indicated by yes ("Y") in column 508) in response to each of DB operation statements 1, 2 and 3. This is because each of the DB operation statements specifies operation (in this case an UPDATE), shown by an X in the corresponding column, on at least one of the fields (C1M, C2M, C1Y, C2Y) specified by trigger definition portion 502.

Figure 5B:
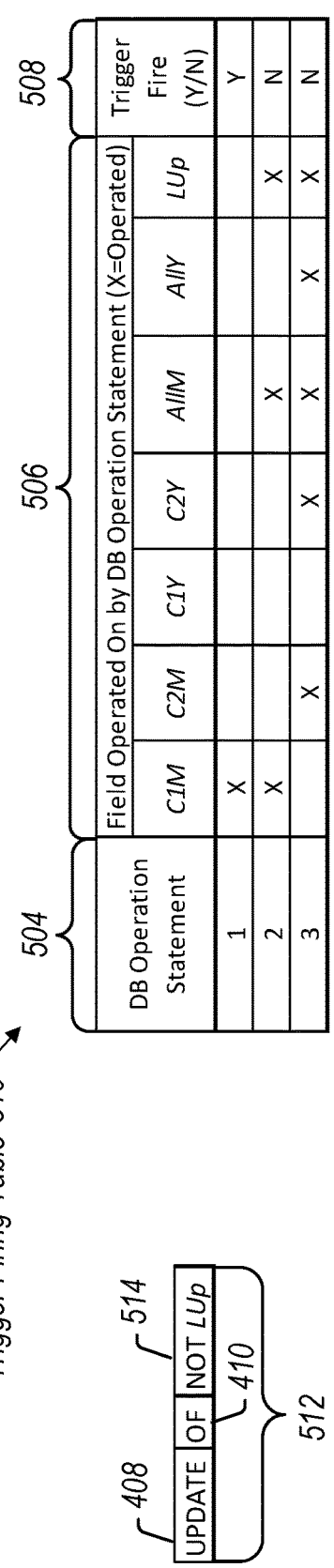

FIG. 5B illustrates trigger firing behavior for a trigger having firing criteria defined using trigger definition portion 512. Like portion 502 of FIG. 5A, trigger definition portion 512 specifies an UPDATE operation. Instead of including operated-on field elements 412, however, trigger definition portion 512 includes a non-operated-on field element 514. Non-operated-on field element 514 is used to identify a field that is not operated on by the database operation specified in the trigger definition. In the embodiment of FIG. 5B, the non-operated-on property of the identified LUp field is indicated by "NOT" in the trigger definition statement; in other embodiments other notation could be used for this purpose. Viewed in conjunction with FIG. 3, trigger definition portion 512 specifies that the defined trigger will fire if a received database operation statement specifies an UPDATE operation but does not specify performing that update on a value in the column corresponding to LUp field 316 in Table 300.

Trigger firing table 510 of FIG. 5B is similar to trigger firing table 500 of FIG. 5A in terms of the properties of the example database operation statements. Trigger firing column 508 may include different values in table 510, however, based on the different trigger firing logic defined by trigger definition portion 512. For the scenario of FIG. 5B, the trigger will fire in response to database operation statement 1, but not in response to statements 2 or 3. This is because statement 1 does not operate on the LUp field, therefore meeting the firing criteria defined by trigger definition portion 512. Statements 2 and 3, on the other hand, both operate on the LUp field and therefore do not cause the trigger to fire. The capability of defining a trigger to fire when a field is not updated or otherwise operated upon may provide a reduction in unnecessary trigger firings. For example, triggers for the purpose of making sure certain fields are updated can be specifically tailored to trigger only when the certain fields are not updated.

FIG. 5C illustrates trigger firing behavior for another scenario with a trigger defined using trigger definition portion 522. Trigger definition portion 522 includes two non-operated-on field elements 514, thereby specifying that the trigger will fire if either of the identified fields is not operated on by an operation statement specifying the operation and target table identified by the trigger definition. Viewed in conjunction with FIG. 3, trigger definition portion 522 specifies that the defined trigger will fire if a received database operation statement specifies an UPDATE operation but does not specify performing that update on a value in the column corresponding to AllM field 312 of table 300 or does not specify performing that update on a value in the column corresponding to AllY field 314.

As shown in column 508 of trigger firing table 520, the trigger defined using trigger definition portion 522 will fire in response to database operation statements 1 and 2 but not in response to database statement 3. Database statement 1 does not specify operation on either of the AllM or AllY fields, causing the trigger to fire. Although database statement 2 specifies operation on the AllM field, it does not specify operation on the AllY field; the non-specification of the AllY field is sufficient to cause the trigger to fire based on trigger definition portion 522. Database statement 3 specifies operation on both the AllM and AllY fields, so that neither of the fields is not specified for operation. As a result, the trigger does not fire in response to database statement 3. A trigger definition statement including a portion similar to portion 522 may be useful, for example, in defining a trigger for ensuring that each of multiple columns gets operated on by an operation statement.

FIG. 5D illustrates trigger firing behavior for yet another scenario with a trigger defined using trigger definition portion 532. Trigger definition portion 532 includes an operated-on field element 412 and a non-operated-on field element 514. This trigger firing logic causes a trigger to fire if the field identified in element 412 is operated on or if the field identified in element 514 is not operated on. Viewed in conjunction with FIG. 3, trigger definition portion 522 specifies that the defined trigger will fire if a received database operation statement specifies an UPDATE operation and either specifies operation on a value in the column corresponding to C2M field 306 of table 300 or does not specify operation on a value in the column corresponding to LUp field 316.

As shown in column 508 of trigger firing table 530, the trigger defined using trigger definition portion 522 will fire in response to database operation statements 1 and 3 but not in response to database statement 2. Database statement 1 does not specify operation on the C2M field but meets the firing criteria of trigger definition portion 532 because it also does not specify operation on the LUp field. Database statement 3 does specify operation on the LUp field but meets the firing criteria because it also specifies operation on the C2M field. Database statement 2 does not cause the trigger to fire because it does not specify operation on the C2M field but does specify operation on the LUp field. Comparing the scenario of FIG. 5D with that of FIG. 5B, in which NOT LUp is the only column-based firing criterion, shows that including an additional field element in the trigger definition caused the trigger to fire for a larger range of database operation statements. This is a result of the OR operation used to combine column-based firing criteria in the embodiments of FIGS. 5A-5D.

FIGS. 6A-6D illustrate additional trigger definition embodiments that may allow unnecessary trigger firings to be reduced. Turning to FIG. 6A, trigger definition portion 602 includes elements similar to trigger definition portions of FIGS. 5A-5D, except that portion 602 includes an AND combination element 604. In the embodiment of FIG. 6A, use of element 604 between operated-on field elements 412 specifies that the defined trigger will fire only if both of the identified fields are specified to be operated on by a database operation statement specifying the same operation and target table as the trigger definition. In the embodiment of FIG. 6A, the AND-combination property of element 604 is indicated by "AND" in the trigger definition statement. Other notation and/or trigger definition structure may be used in other embodiments. For example, an indicator of the "AND" property may be combined with a field indicator such as indicator 412 in some embodiments. Viewed in conjunction with FIG. 3, trigger definition portion 602 specifies that the defined trigger will fire if a received database operation statement specifies an UPDATE operation and specifies operation on both a value in the column corresponding to C1M field 304 and a value in the column corresponding to C2M field 306 of table 300.

Trigger firing table 600 of FIG. 6A is similar to the trigger firing tables of FIGS. 5A-5D in terms of the properties of the example database operation statements, with values of trigger firing column 508 depending on the trigger firing logic defined by trigger definition portion 602. For the scenario of FIG. 6A, the trigger will not fire in response to any of database operation statements 1, 2 or 3. This is because none of the example database operation statements specifies operation on both the C1M and C2M fields as specified in trigger definition portion 602. If a trigger that fires only when all of two or more conditions are met is needed, the capability of using an AND combination in the trigger definition may reduce the number of unnecessary trigger firings. In an embodiment, implementing such a trigger using an OR combination would involve firing a trigger each time at least one of the needed conditions is met, and then checking database values as part of the trigger execution procedure to test for whether the other needed condition(s) are met. Such a procedure could result in substantial additional resource use by the database node.

FIG. 6B illustrates trigger firing behavior for a trigger having firing criteria defined using trigger definition portion 612. Trigger definition portion 612 is similar to portion 602 of FIG. 6A in that it specifies an AND combination of fields in an UPDATE operation. In the case of trigger definition portion 612, however, non-operated-on fields 514 are combined rather than operated-on fields 412. Trigger definition portion 612 therefore specifies that the defined trigger will fire only if both the C1Y and C2Y fields are not specified to be updated by a database operation statement. Viewed in conjunction with FIG. 3, trigger definition portion 612 specifies that the defined trigger will fire if a received database operation statement specifies an UPDATE operation and does not specify updating of either the C1Y or C2Y fields.

As shown in column 508 of trigger firing table 610, the trigger defined using trigger definition portion 612 will fire in response to database operation statements 1 and 2 but not in response to database operation statement 3. Database operation statement 3 does not specify operation on the C1Y field but because it specifies operation on the C2Y field it does not meet the firing criteria of both of the fields not being specified for update. A trigger definition including a portion similar to portion 612 may be useful in defining a trigger for ensuring that at least one of multiple columns gets operated on by an operation statement, without requiring both columns to be operated on. In the scenario of FIG. 6B for example, the trigger defined using trigger definition portion 612 may be useful if at least one, but not necessarily both, of the yearly sales for customer 1 and customer 2 should be updated in the event of any update statement.

FIG. 6C illustrates trigger firing behavior for another scenario, with a trigger defined using trigger definition portion 622. Trigger definition portion 622 includes an operated-on field element 412 and a non-operated-on field element 514 combined using an AND operation. This trigger firing logic causes a trigger to fire if the field identified in element 412 is operated on and the field identified in element 514 is not operated on. Viewed in conjunction with FIG. 3, trigger definition portion 622 specifies that the defined trigger will fire if a received database operation statement specifies an UPDATE operation and specifies operation on a value in the column corresponding to C1M field 304 of table 300 and does not specify operation on a value in the C1Y field.

As shown in column 508 of trigger firing table 620, the trigger defined using trigger definition portion 622 will fire in response to database operation statements 1 and 2 but not in response to database operation statement 3. Statements 1 and 2 meet the criteria of both operating on the C1M field and not operating on the C1Y field. A trigger definition statement including a portion similar to portion 622 may be useful, for example, in situations where two columns of a database are related in a way that one column should be updated if the other column is updated, but not necessarily otherwise.

FIG. 6D illustrates firing behavior for still another scenario having a trigger defined using trigger definition portion 632. Trigger definition portion 632 includes grouping elements 634 to indicate a group of non-operated-on field elements 514 in an OR relationship with one another, the group connected with an AND operation to an operated-on field element 412. In the embodiment of FIG. 6D, the grouping elements are indicated with parentheses in the trigger definition, but other notation and/or trigger definition structures could be used in other embodiments. For example, a grouping indicator may be combined into a field element such as an element 412 or 514 in some embodiments. Viewed in conjunction with FIG. 3, trigger definition portion 632 specifies that the defined trigger will fire if a received database operation statement specifies an UPDATE operation and specifies operation on a value in the column corresponding to C1M field 304 of table 300 and does not specify operation on a value in at least one of the C1Y, AllM or AllY fields.

As shown in column 508 of trigger firing table 630, the trigger defined using trigger definition portion 632 will fire in response to database operation statements 1 and 2 but not in response to database operation statement 3. Statements 1 and 2 cause the trigger to fire because they specify updating of the C1M field and do not specify updating of at least one of the C1Y, AllM or AllY fields. A trigger definition statement including a portion similar to portion 632 may be useful, for example, in a situation where in the event that a first field is updated multiple other fields need to be updated as well; the trigger will fire if the first field is updated and at least one of the other fields is not.

Multiple variations and extensions of field types, groupings and combination types may be employed to define trigger firing criteria implementing various Boolean expressions in various embodiments. For example, a group of elements could be combined using OR combinations, AND combinations or both, and multiple levels of nested grouping could be employed. Field identifiers may identify operated-on fields or non-operated-on fields and both types of field may be combined in various expressions. In an embodiment, AND combination elements and grouping elements as described in connection with FIGS. 6A-6D are stored by a database node as part of firing criteria 164 within trigger information 162 of FIG. 2 during analysis by the database node of a received trigger definition.

Figure 7:
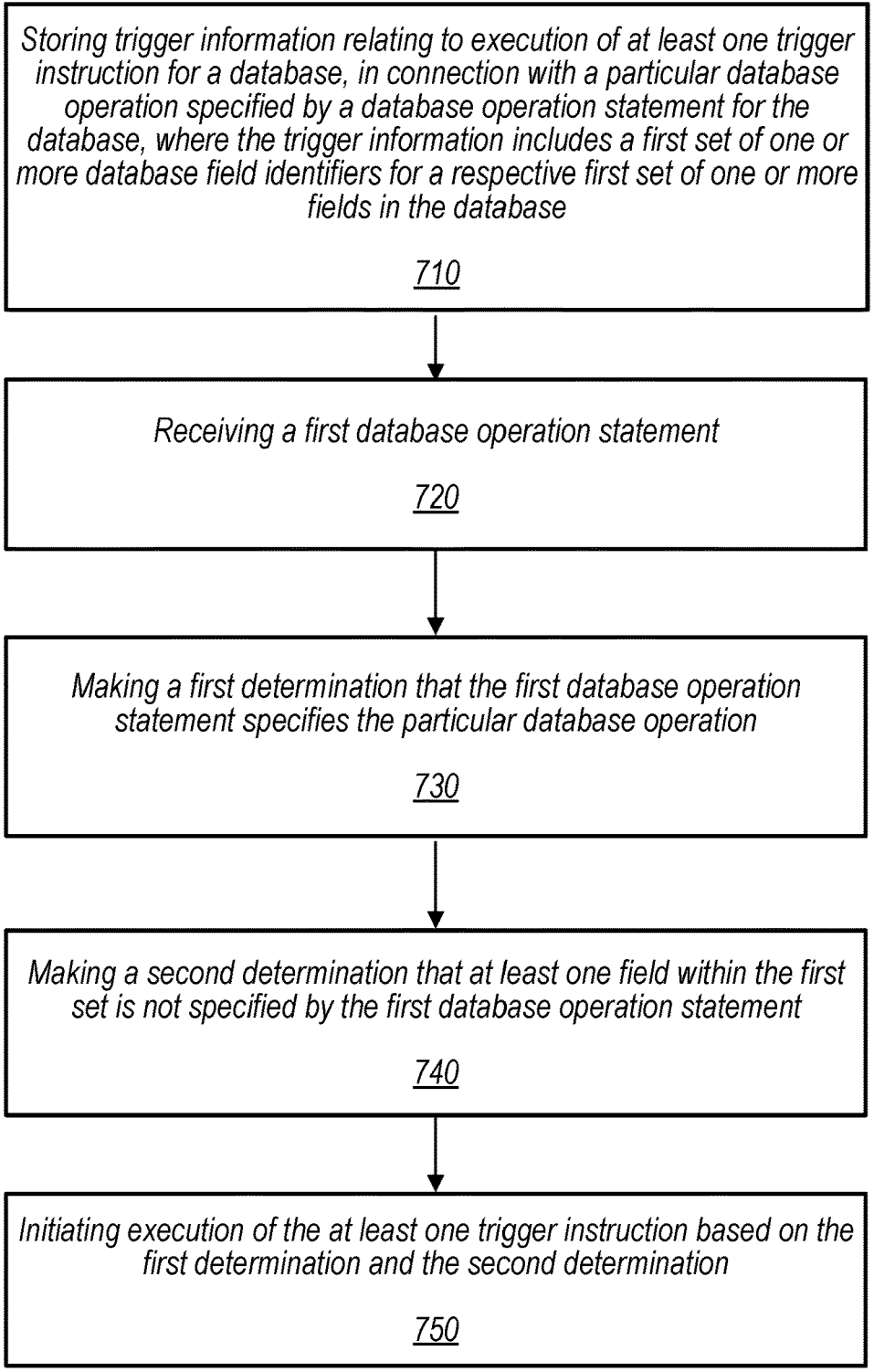

Turning now to FIG. 7, a flow diagram of a method 700 is shown. Method 700 is one embodiment of a method performed by a computer system (e.g., system 100, a database node 140, etc.) to initiate execution of a database trigger based at least in part on a field not being specified by a database operation statement. Method 700 may be performed by executing program instructions stored on a non-transitory computer-readable medium. In some embodiments, method 700 can include more or fewer blocks than shown. For example, method 700 may include a block in which the computer system receives trigger information from a user.

Method 700 includes, at block 710, storing trigger information relating to execution of at least one trigger instruction for a database, in connection with a particular database operation specified by a database operation statement for the database. In an embodiment, the particular database operation is a database update operation. The particular database operation may in other embodiments be another type of database operation that can be performed on a per-field or per-column basis. As noted in block 710, the trigger information includes a first set of one or more database field identifiers for a respective first set of one or more fields in the database. Examples of such database field identifiers include non-updated field identifiers 166 in FIG. 1 and non-operated-on field identifiers 218 in FIG. 2. In an embodiment, the first set of one or more fields are fields within a targeted database table or database view, such as target table 214 of FIG. 2.

The storing of trigger information in block 710 may be performed by a database node in connection with analysis of a trigger definition provided by a user of the database. In an embodiment, a user providing a trigger definition is a database administrator. The stored trigger information may include other information in various embodiments, such as an identifier of a target database table or view, or additional sets of one or more field identifiers for respective additional sets of one or more fields in the database. As further examples, other trigger information may include an identifier of the particular database operation, an indicator of an AND operation to be performed between specified database fields, and/or indicators of grouping of specified database fields for implementing Boolean expressions defining trigger firing criteria.

Method 700 further includes receiving a first database operation statement, in block 720, and making a first determination that the first database operation statement specifies the particular database operation, in block 730. In a scenario like those of FIGS. 5A-5D and 6A-6D in which the particular database operation that a trigger is defined for is a database update operation, block 730 would include determining that the first database operation specifies the database update operation. In a further embodiment, the first determination of block 730 also includes a determination that a target table or view specified by the first database operation statement is the same as a target table or view included in the trigger information.

In addition, method 700 includes, at block 740, making a second determination that at least one field within the first set of one or more database fields is not specified by the first database operation statement. If, for example, the first set of one or more fields includes a single field, the second determination is a determination that the single field is not specified as being operated on by the first database operation statement. An example of a trigger for which such a determination is made as part of the trigger firing analysis is the trigger in the scenario of FIG. 5B above. In the scenario of FIG. 5B, stored trigger information may include a first set of field identifiers including the single database field identifier LUp. If the first set of one or more fields includes multiple fields, the second determination is a determination that at least one of those multiple fields is not specified as being operated on by the first database operation statement. An example of a trigger for which the first set of database field identifiers includes multiple field identifiers is the trigger in the scenario of FIG. 5C above. In the scenario of FIG. 5C, stored trigger information may include a first set of field identifiers including the two field identifiers AllM and AllY.

Method 700 further includes, at block 750, initiating execution of the at least one trigger instruction based on the first determination and the second determination. Method 700 therefore includes firing of a trigger based at least in part on a determination that at least one database field is not specified by a database operation statement. The scenarios of FIGS. 5B and 5C above are examples of trigger firing based on such a determination. In an embodiment, method 700 can be used to implement a trigger ensuring that a timestamp field, such as field LUp of FIG. 3, is updated. In some embodiments, method 700 can be used to implement a BEFORE trigger in which the at least one trigger instruction is executed before new data is stored in a table of the database as a result of executing the first database operation statement.

In various embodiments, the initiating execution of block 750 may be further based on additional firing criteria. Such additional firing criteria may be associated with additional stored trigger information. For example, trigger firing may be based on an AND combination of the second determination with another determination that an additional field is either specified or not specified by the first database operation statement, as in the scenarios of FIGS. 6B and 6C above. In other examples, trigger firing criteria may include the second determination in a more complex Boolean relationship involving groupings of additional field identifiers.

Turning now to FIG. 8, a flow diagram of a method 800 is shown. Method 800 is one embodiment of a method performed by a computer system (e.g., system 100, a database node 140, etc.) to determine whether a database trigger should be initiated. Method 800 is similar to method 700 of FIG. 7, and the descriptions and variations described in connection with method 700 generally apply to corresponding elements of method 800 as well. Method 800 involves determining whether firing criteria are met, however, as opposed to determining that the criteria are met, so that the method may or may not result in firing of a trigger in response to a given received database operation statement. Method 800 may be performed by executing program instructions stored on a non-transitory computer-readable medium. In some embodiments, method 800 can include more or fewer blocks than shown.

Method 800 includes, at block 810, storing trigger information relating to execution of at least one trigger instruction for a database, in connection with a database update operation specified by a database operation statement for the database. In other embodiments, the trigger information may relate to execution of at least one trigger instruction in connection with a database operation other than an update operation. As noted in block 810, the trigger information includes a first set of one or more database field identifiers for a respective first set of one or more fields in the database. Method 800 further includes receiving, at block 820, a first database operation statement specifying the database update operation, and making a first determination, at block 830, of whether at least one field within the first set of fields is not specified by the first database operation statement. At block 840, the method includes making a second determination, based at least in part on a result of the first determination, of whether to initiate execution of the at least one trigger instruction.

In an embodiment, making the second determination in block 840 includes making a determination to initiate execution of the at least one trigger instruction if the result of the first determination is that at least one field within the first set of one or more fields is not specified by the first database operation statement. Such an embodiment would implement trigger firing criteria such as those in the scenarios of FIGS. 5B and 5C.

In various embodiments, making the second determination is further based on additional trigger firing criteria. For example, making the second determination could be based in part on a third determination of whether at least one field within a second set of one or more fields is specified by the first database operation statement. This third determination could be combined with the first determination using an OR operation in some embodiments of making the second determination, to implement a trigger similar to that illustrated by the scenario of FIG. 5D. In other embodiments, such a third determination could be combined with the first determination using an AND operation, to implement a trigger similar to that illustrated by the scenario of FIG. 6C. As another example, making the second determination could be based in part on a third determination of whether at least one field within a second set of one or more fields is not specified by the first database operation statement. This third determination could be combined with the first determination using OR or AND operations in various embodiments, corresponding to trigger firing implementations similar to those of FIG. 5C (OR combination) or FIG. 6B (AND combination).

In further examples, making the second determination may involve evaluating trigger firing criteria implementing a more complex Boolean relationship involving groupings of additional field identifiers. In one embodiment, for example, the trigger information for method 800 may further include a second set of database field identifiers for a respective second set of one or more fields in the database and a third set of database field identifiers for a respective third set of one or more fields in the database. In such an embodiment the second determination may be based in part on a first logical combination of a third determination involving the second set of one or more fields and a fourth determination involving the third set of one or more fields. In various embodiments, the third determination may be whether at least one field in the second set of fields either is, or is not, specified by the first database operation statement. Similarly, the fourth determination may in various embodiments be whether at least one field in the third set of fields is, or is not, specified by the first database operation statement. The first logical combination may be either an AND or an OR combination in various embodiments. In a further embodiment, the second determination may be based on a second logical combination of the first determination with a result of the first logical combination. Such an embodiment effectively implements a grouping together of the third and fourth determinations (relating to the second and third sets of fields) for combination with the first determination (relating to the first set of fields).

FIG. 9 illustrates a flow diagram of a method 900. Method 900 is one embodiment of a method performed by a computer system such as a database node to initiate execution of a database trigger based at least in part on an AND combination of field-based trigger firing criteria. The descriptions and variations described above in connection with methods 700 and 800 generally apply to similar elements of method 900 as well. Method 900 may be performed by executing program instructions stored on a non-transitory computer-readable medium. In some embodiments, method 900 can include more or fewer blocks than shown in FIG. 9. For example, method 900 may include a block in which a computer system receives trigger information from a user.

Method 900 includes, at block 910, storing trigger information relating to execution of at least one trigger instruction for a database, in connection with a particular database operation specified by a database operation statement for the database. In an embodiment, the particular database operation is a database update operation. As noted in block 910, the trigger information includes a first set of one or more database field identifiers for a respective first set of one or more fields in the database and a second set of one or more database field identifiers for a respective second set of one or more fields in the database. In an embodiment, the first and second sets of fields are fields within a targeted database table or view, such as target table 214 of FIG. 2.

Method 900 further includes receiving a first database operation statement specifying the particular database operation (at block 920), making a first determination relating to the first database operation statement and the first set of one or more fields (at block 930), and making a second determination relating to the first database operation statement and the second set of one or more fields (at block 940). In some embodiments the first determination is a determination that the first database operation statement specifies at least one field within the first set. In other embodiments, the first determination is a determination that at least one field within the first set is not specified by the first database operation statement. Similarly, the second determination in some embodiments determines that the first database operation statement specifies at least one field within the second set of one or more fields, and in other embodiments determines that at least one field within the second set is not specified by the first database operation statement.

At block 950, method 900 includes initiating execution of the at least one trigger instruction based on the first determination and the second determination. Method 900 therefore includes firing of a trigger based at least in part on both a first trigger firing criterion represented by the first determination of block 930 and a second firing criterion represented by the second determination of block 940. In one embodiment, the first determination is that at least one field in the first set is specified by the first database operation statement and the second determination is that at least one field in the second set is also specified by the first database operation statement, so that a trigger with firing criteria similar to that in the scenario of FIG. 6A is implemented. In another embodiment, the first determination is that at least one field in the first set is not specified by the first database operation statement and the second determination is that at least one field in the second set is also not specified by the first database operation statement, so that a trigger with firing criteria similar to that in the scenario of FIG. 6B is implemented. In still another embodiment, the first determination is that at least one field in the first set is specified by the first database operation statement and the second determination is that at least one field in the second set is not specified by the first database operation statement, so that a trigger with firing criteria similar to that in the scenario of FIG. 6C is implemented. One or more of the first determination of block 930, the second determination of block 940 or the initiating execution of block 950 may involve groupings of multiple elements in various embodiments, so that trigger firing criteria implementing generalized Boolean expressions may be defined.

Example Computer System

Figure 10:
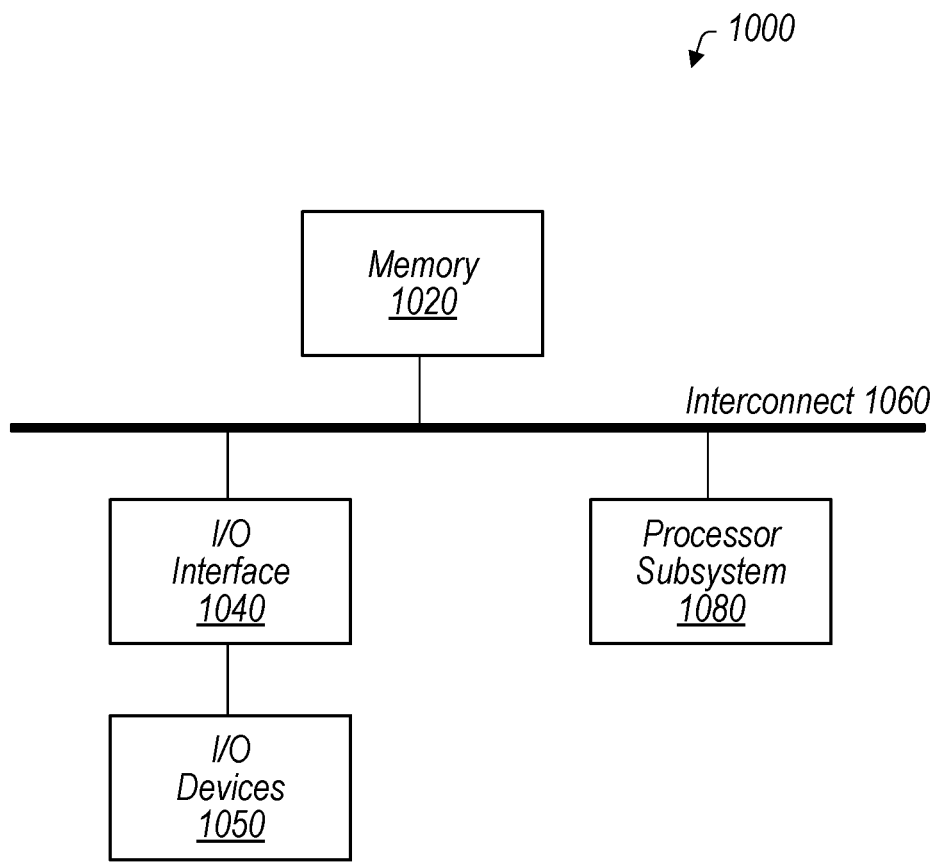
FIG. 10 is a block diagram illustrating elements of a computer system for implementing various systems described in the present disclosure, according to some embodiments.

Turning now to FIG. 10, a block diagram of an example computer system 1000, which may implement system 100, database 110, and/or database node 140 is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable to store program instructions executable by processor subsystem 1080 to cause system 1000 to perform various operations described herein. System memory 1020 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem

1080. In some embodiments, program instructions that when executed implement database engine 150 and/or database triggers 160 may be included/stored within system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    storing, by a computer system, trigger information relating to initiating execution of at least one trigger instruction for a database, in connection with a database update operation specified by a database operation statement for the database, wherein
        at least a portion of the trigger information corresponds to elements of a trigger definition provided to the computer system,
        the elements of the trigger definition include a name of a procedure containing the at least one trigger instruction, and
        the trigger information includes a first set of one or more database field identifiers for a respective first set of one or more fields in the database;
    receiving, by the computer system, a first database operation statement;
    making, by the computer system, a first determination that the first database operation statement specifies the database update operation;
    making, by the computer system, a second determination that at least one database field identifier within the first set of one or more database field identifiers is not included in the first database operation statement; and
    initiating, by the computer system, execution of the procedure containing the at least one trigger instruction based on the first determination and the second determination.

2. The method of claim 1, wherein:
    the trigger information further includes a second set of one or more database field identifiers for a respective second set of one or more fields in the database; and
    initiating execution of the procedure containing the at least one trigger instruction is further based on a third determination that at least one field within the second set of one or more fields is included in the first database operation statement.

3. The method of claim 1, wherein:
    the trigger information further includes a second set of one or more database field identifiers for a respective second set of one or more fields in the database; and
    initiating execution of the procedure containing the at least one trigger instruction is further based on a third determination that at least one field within the second set of one or more fields is not included in the first database operation statement.

4. The method of claim 1, wherein the at least one trigger instruction is executable to perform one or more operations including updating a timestamp stored in a timestamp field of the database.

5. The method of claim 1, wherein the at least one trigger instruction is executable to perform one or more operations before new data is written to a data table of the database as a result of the first database operation statement.

6. A non-transitory computer readable medium having program instructions stored thereon that are capable of causing a computer system to perform operations comprising:
- storing trigger information relating to initiating execution of at least one trigger instruction for a database, in connection with a particular database operation specified by a database operation statement for the database, wherein
  - at least a portion of the trigger information corresponds to elements of a trigger definition provided to the computer system,
  - the elements of the trigger definition include a name of a procedure containing the at least one trigger instruction, and
  - the trigger information includes a first set of one or more database field identifiers for a respective first set of one or more fields in the database;
- receiving a first database operation statement;
- making a first determination that the first database operation statement specifies the particular database operation;
- making a second determination that at least one database field identifier within the first set of one or more database field identifiers is not included in the first database operation statement; and
- initiating execution of the procedure containing the at least one trigger instruction based on the first determination and the second determination.

7. The computer readable medium of claim 6, wherein:
the trigger information further includes a second set of one or more database field identifiers for a respective second set of one or more fields in the database; and
initiating execution of the procedure containing the at least one trigger instruction is further based on a third determination that at least one field within the second set of one or more fields is included in the first database operation statement.

8. The computer readable medium of claim 6, wherein:
the trigger information further includes a second set of one or more database field identifiers for a respective second set of one or more fields in the database; and
initiating execution of the procedure containing the at least one trigger instruction is further based on a third determination that at least one field within the second set of one or more fields is not included in the first database operation statement.

9. The computer readable medium of claim 6, wherein the particular database operation is a database update operation.

10. The computer readable medium of claim 6, wherein the trigger information further includes an operation identifier corresponding to the particular database operation.

11. The computer readable medium of claim 6, wherein the at least one trigger instruction is executable to perform one or more operations including updating a timestamp stored in a timestamp field of the database.

12. The computer readable medium of claim 6, wherein the at least one trigger instruction is executable to perform one or more operations before new data is written to a data table of the database as a result of the first database operation statement.

13. A system, comprising:
at least one processor; and
memory having program instructions stored thereon that are executable by the at least one processor to cause the system to perform operations comprising:
- storing trigger information relating to initiating execution of at least one trigger instruction for a database, in connection with a database update operation specified by a database operation statement for the database, wherein
  - at least a portion of the trigger information corresponds to elements of a trigger definition provided to the processor,
  - the elements of the trigger definition include a name of a procedure containing the at least one trigger instruction, and
  - the trigger information includes a first set of one or more database field identifiers for a respective first set of one or more fields in the database;
- receiving a first database operation statement specifying the database update operation;
- making a first determination of whether at least one database field identifier within the first set of one or more database field identifiers is not included in the first database operation statement; and
- making a second determination, based at least in part on a result of the first determination, of whether to initiate execution of the procedure containing the at least one trigger instruction.

14. The system of claim 13, wherein making the second determination includes making a determination to initiate execution of the procedure containing the at least one trigger instruction if the result of the first determination is that at least one database field identifier within the first set of one or more database field identifiers is not included in the first database operation statement.

15. The system of claim 13, wherein:
the trigger information further includes a second set of one or more database field identifiers for a respective second set of one or more fields in the database; and
the second determination is further based on a result of a third determination of whether at least one database field identifier within the second set of one or more database field identifiers is included in the first database operation statement.

16. The system of claim 15, wherein making the second determination includes determining whether the result of the first determination is that at least one database field identifier within the first set of one or more database field identifiers is not included in the first database operation statement or the result of the third determination is that at least one database field identifier within the second set of one or more database field identifiers is included in the first database operation statement.

17. The system of claim 15, wherein making the second determination includes determining whether the result of the first determination is that at least one database field identifier within the first set of one or more database field identifiers is not included in the first database operation statement and the result of the third determination is that at least one database field identifier within the second set of one or more database field identifiers is included in the first database operation statement.

18. The system of claim 13, wherein:
the trigger information further includes a second set of one or more field identifiers for a respective second set of one or more fields in the database; and
wherein making the second determination includes determining whether the result of the first determination is that at least one database field identifier within the first set of one or more database field identifiers is not included in the first database operation statement and at least one database field identifier within the second set of one or more database field identifiers is not included in the first database operation statement.

19. The system of claim 13, wherein:
the trigger information further includes a second set of one or more database field identifiers for a respective second set of one or more fields in the database and a third set of one or more database field identifiers for a respective third set of one or more fields in the database; and
wherein the second determination is further based on a first logical combination of a third determination involving the second set of one or more database field identifiers and a fourth determination involving the third set of one or more database field identifiers.

20. The system of claim 19, wherein the second determination is further based on a second logical combination of the first determination with a result of the first logical combination.

\* \* \* \* \*